(12) United States Patent
Ice

(10) Patent No.: US 7,174,782 B2
(45) Date of Patent: Feb. 13, 2007

(54) TOTAL AIR TEMPERATURE PROBE PROVIDING A SECONDARY SENSOR MEASUREMENT CHAMBER

(75) Inventor: Paul A. Ice, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 10/947,546

(22) Filed: Sep. 22, 2004

(65) Prior Publication Data
US 2005/0193812 A1 Sep. 8, 2005

Related U.S. Application Data

(63) Continuation of application No. 10/367,625, filed on Mar. 13, 2003, now abandoned.

(51) Int. Cl.
G01F 1/68 (2006.01)
(52) U.S. Cl. ................................ 73/204.22; 374/135
(58) Field of Classification Search ...................... None
See application file for complete search history.

(56) References Cited

U.S. PATENT DOCUMENTS

| 3,738,167 A | 6/1973 | White et al. ................... 73/181 |
| 4,182,180 A | 1/1980 | Mott | |
| 4,821,566 A | 4/1989 | Johnston et al. | |
| 5,895,838 A | 4/1999 | Harjunmaa et al. | |
| 6,272,913 B1 | 8/2001 | Naegele et al. ............ 73/118.2 |
| 6,622,556 B1 | 9/2003 | May .......................... 73/202.5 |

FOREIGN PATENT DOCUMENTS

| EP | 0 287 223 A1 | 10/1988 |
| WO | WO 94/02814 | 2/1994 |

OTHER PUBLICATIONS

Jul. 26, 2004, European Search Report.
Model 101 and 102 Total Temperature Sensors, Bulletin 1012, Feb. 1996, Rosemount Aerospace, Eagan, MN.
Truman M. Stickney, Marvin W. Shedlov, Donald I. Thompson, Goodrich Total Temperature Sensors; Technical Report 5755, Revision C., 1994, Goodrich Corporation/Rosemount Aerospace Inc., Burnsville, MN.
Proposal D0020079 for Water Vapor Sensing System II, Mar. 2, 2000, BF Goodrich Aerospace, Aircraft Sensors Division (not published).

*Primary Examiner*—Harshad Patel
(74) *Attorney, Agent, or Firm*—Womble Carlyle Sandridge & Rice, PLLC

(57) ABSTRACT

A total air temperature sensor probe samples the air stream surrounding an aircraft in flight, and includes a duct carrying a fluid flow a portion of which is diverted to a primary chamber mounting a total air temperature sensor. A secondary chamber has a secondary sensor for sensing a different property of a sampled air stream. The secondary chamber is open to receive air flow from passageways in the total air temperature probe.

24 Claims, 5 Drawing Sheets

129 LOW PRESSURE SOURCE

TOTAL AIR TEMPERATURE PROBE PROVIDING A SECONDARY SENSOR MEASUREMENT CHAMBER

This is a Continuation of U.S. patent application Ser. No. 10/367,625, filed Mar. 13, 2003, now abandoned the contents of which are incorporated by reference in their entirety.

BACKGROUND OF THE INVENTION

The present invention relates to a total air temperature sensor probe carrying a total air temperature sensor in a primary chamber, and having a second chamber in which an additional or secondary sensor is mounted. The secondary sensor is used for measuring additional properties or constituents of air.

Having a second sensor in a probe presents challenges in accommodating the operational needs of such sensor or probe. Impingement of liquid water droplets in the air flow can electrically short out some types of sensors, and if the sensor projects directly into the airstream, airborne debris can mechanically damage or contaminate the sensor. The sensors may require certain geometric features such as alignment of parts or specific transmission distances, particularly when using optical-based sensors.

A total air temperature probe housing must be constructed in a manner to maintain the integrity of the primary measurement, namely total air temperature. Inclusion of a secondary sensor can potentially interfere with the air flow past the total air temperature sensor, and thus reduce the integrity of the total air temperature measurement.

SUMMARY OF THE INVENTION

The present invention relates to a total air temperature sensor probe that has a total air temperature sensor mounted in a primary chamber or passageway and which has a separate interior or secondary chamber. Both chambers are protected from debris and impingement of water droplets. The separate interior chamber has a separate, second or secondary sensor therein. The secondary sensor is designed to obtain a measurement of a selected air data parameter (other then total air temperature), in order to determine properties of the sampled air stream, or of the air mass in which the probe is immersed.

The secondary chamber is formed within the probe housing, and is open to passageways that provide an air flow into the secondary chamber, and across the secondary sensor, without disrupting the primary air flow across the total temperature sensor in the primary chamber. Also, the secondary chamber has an air flow inlet positioned so as to limit or avoid introduction of water droplets, ice crystals and airborne particles and debris into the secondary chamber.

In one embodiment of the invention, the secondary chamber is positioned in the probe housing forwardly (on the upstream side) of the total air temperature sensor primary chamber. The inlet port to the secondary chamber is connected to a laterally extending channel containing air drawn from the bulk air mass surrounding the probe. The laterally extending channel can also be connected to bleed holes used to bleed off boundary layer air from the primary flow scoop. Thus, the air within the laterally extending channel can also include bleed air in some embodiments. Due to the construction of the secondary chamber, and particularly its connection to the relatively protected laterally extending channel, air admitted into the secondary channel does not contain directly impinging water droplets, particles, and the like. If desired, both a forward secondary chamber and an aft secondary chamber can be involved, each housing a corresponding secondary sensor.

Alternatively, a chamber aft (or on the downstream side) of the main total air temperature sensor primary chamber can be provided in configurations illustrated herein, for mounting a secondary sensor. Suitable ports duct air across the secondary sensor, and keep it shielded from particles and debris.

DETAILED DESCRIPTION OF THE PREFERRED EMBODIMENTS

Figure 1:
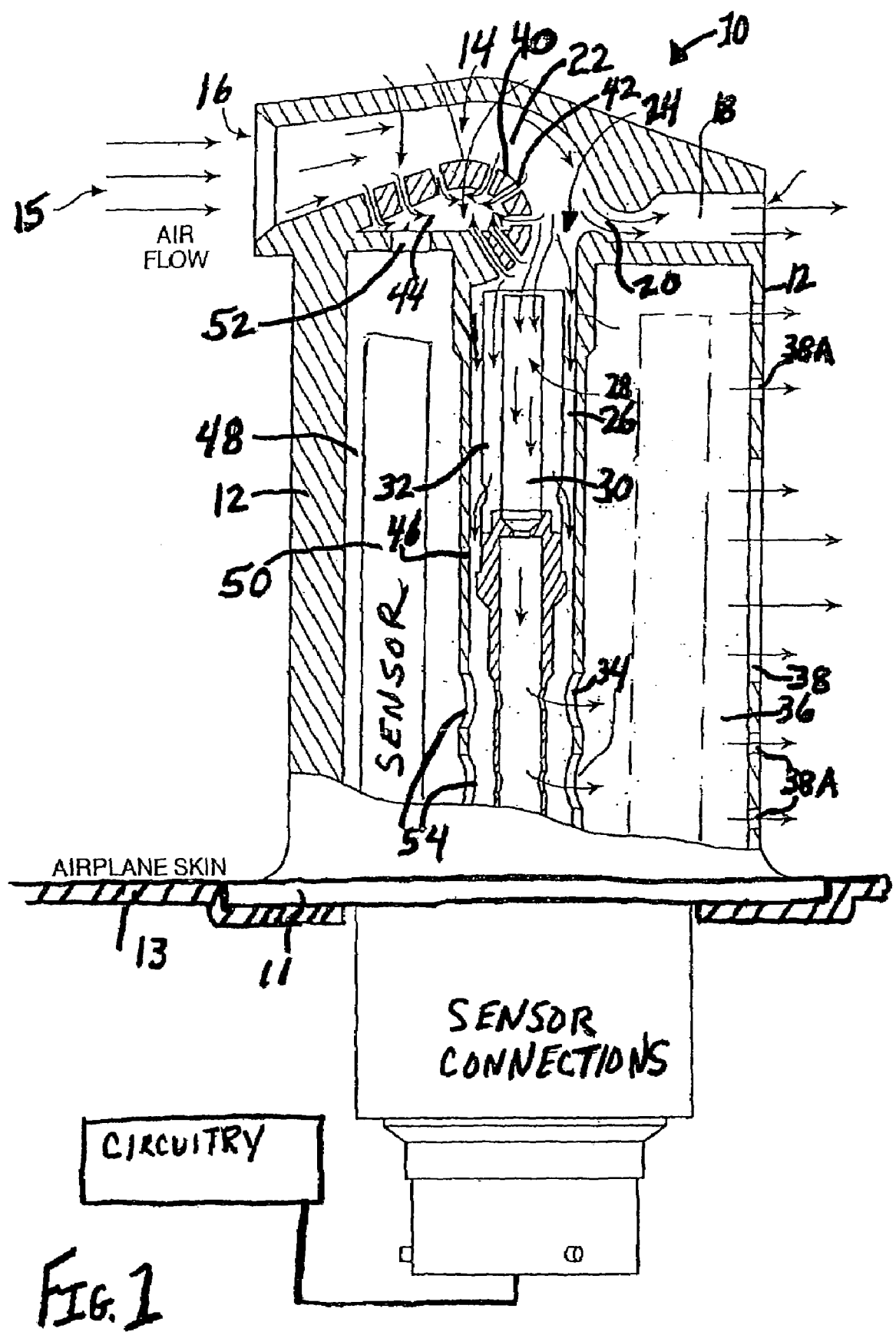
FIG. 1 is a sectional view of a total air temperature sensor probe having a secondary chamber for mounting a sensor and made according to an embodiment of the present invention.

A total air temperature (sometimes called a TAT) sensor probe 10 includes an outer probe housing 12 that is suitably formed to have a streamlined, generally airfoil cross sectional shape. The housing 12 has a base 11 supported on an aircraft skin 13. The housing 12 further includes an interior air flow duct 14 (the primary air flow passage) that has an inlet scoop 16 at a leading (or upstream) end to receive air flowing in the direction indicated by arrows 15. An exit channel 18 is provided at the downstream (or trailing) end of the housing. In some embodiments, a constriction or venturi portion 20 is also formed in mid portions of duct 14. However, other embodiments of the air data sensor probes of the invention do not include constriction or venturi portion 20.

The duct 14 has a flow separation bend 22 that diverts a portion of the air flow between the inlet scoop 16 and the exit channel 18 and causes the diverted air to flow through a port or aperture 24 into a TAT sensor flow passage or primary chamber 26. A temperature sensor assembly 28 is positioned in the primary chamber 26. The temperature sensor assembly includes a sensing element 30, and has a radiation shield 32 around the sensing element. Sensing element 30 senses the temperature of the air that is flowing around the sensor in the primary chamber 26, and then the air in primary chamber 26 exits through ports 34, into an aft chamber 36, and out exit ports 38 and 38A in the wall defining the aft chamber 36.

The flow separation bend 22 is formed in part by an inner elbow or bend curved wall 40, that has a number of boundary layer control bleed holes 42 extending therethrough. The bleed holes 42 lead to a laterally extending air exit passageway 44 (secondary passage). The arrows in the bleed holes 42 in FIG. 1 show that the air that forms a boundary layer around the elbow or bend curve wall 40 bleeds or flows into the passageway 44 and then flows laterally to exit from the passageway 44 at side exit ports (not shown in the sectional view of FIG. 1) at the ends of passageway 44.

TAT sensor primary chamber 26 is formed by a surrounding wall 46, to separate primary chamber 26 from a forward secondary chamber 48 formed in the probe housing 12. The chamber 48 is used for mounting a secondary air data sensor 50. For example, secondary air data sensor 50 can be a humidity sensor, such as an optical or other type of humidity sensor, and can be used in a conventional manner. In other embodiments, secondary air data sensor 50 can be other types of sensors, such as a water vapor sensor, a CO2 sensor, a nitrogen sensor, a pressure sensor, an air constituent sensor, or an air contaminant sensor, to name a few.

Air flow from the laterally extending passageway 44 is admitted into the forward secondary chamber 48 through a flow port 52 placed in the bottom wall forming the laterally extending air passageway 44. Air flowing from passageway 44, through the port 52, and into the secondary chamber 48 is essentially at static pressure. Such air can include air drawn from the bulk air mass surrounding probe 10 which enters passageway 44 at its ends, as well as boundary layer bleed air withdrawn from the primary flow duct via bleed holes 42. Air flowing through the flow port 52 and into the secondary chamber 48 flows across the secondary sensor 50. Air from secondary chamber 48 then exits the secondary chamber through ports 54 connected to primary chamber 26, and through the ports 34 into the aft chamber 36. This air then exits probe 10 through the exit ports 38 and 38A.

Depending on the parameter being measured, the secondary sensor 50 does not require a dynamic flow of air (i.e. air flow from the free stream entering probe 10 at inlet scoop 16) in the same nature as the TAT measurement requires. In other words, the parameter sensed in the secondary chamber may be sensed from air at essentially static pressure provided by laterally extending passageway 44 from the bulk air mass surrounding probe 10. Therefore, the air supplied to the secondary sensor 50 may not need to be taken directly from the primary duct (interior air flow duct 14). For sensing parameters such as humidity, static pressure, and air constituents/contaminants, it is necessary only to admit air into the secondary chamber from the surrounding air mass in which the probe is immersed, in a protected manner. Air entering laterally extending passageway 44 from either bleed holes 42 or from side exit ports of passageway 44 satisfy this need. While the chamber within which the secondary sensor 50 is located must have some volumetric turnover, the properties being measured are more like bulk properties of the air mass.

The channel 44 and port 52 provide a relatively protected area for the secondary sensor 50 from impinging particles, water, etc. This protection is afforded mostly by the overall geometry of the probe since this chamber resides forward of the wall 46 of sensor primary chamber 26 and under inner elbow 40 of air flow duct 14. Air that flows through port 52 from passageway 44 is relatively free of particles that would be of a size sufficient to cause damage to the secondary sensor 50. This is due to the fact that larger particles entering air flow duct 14 will have sufficient kinetic energy to pass through probe 10 at exit channel 18. It is also due to the fact that larger particles will have too much kinetic energy to enter laterally extending passageway 44 from the side exit ports, travel laterally through passageway 44 and down through port 52. Thus, the air flow through the secondary chamber 48 is essentially free of damaging particles, such as ice and the like.

Because the air in chamber 48 is substantially free of damaging particles, fewer design restrictions can be placed on the types of sensors used as secondary air data sensor 50. For example, impingement of liquid water droplets can electrically short certain types of sensors. Also, airborne debris can mechanically damage or contaminate certain types of sensors, such as optical sensors. With embodiments of the invention, these designed restrictions are minimized, allowing particular sensor types of sensor 50 to be selected based on other criteria such as cost or performance.

The air flow through secondary chamber 48 can be controlled by controlling the size of the inlet port 52 so that it will be adequate to flow over the sensor 50. The air then flows out the passageways or ports 54, 34, 38, and 38A. Adequate control of the air flow in the secondary chamber 48, and avoiding particles in such air flow, enables sensors to operate correctly and thus accurate sensing is achieved.

While secondary air data sensor 50 is shown in forward secondary chamber 48, in other embodiments the secondary sensor can instead be located in aft chamber 36. Also, two separate secondary sensors can be included, one in each of chambers 48 and 36. This is described in greater detail with reference to FIGS. 2–6.

Figure 2:
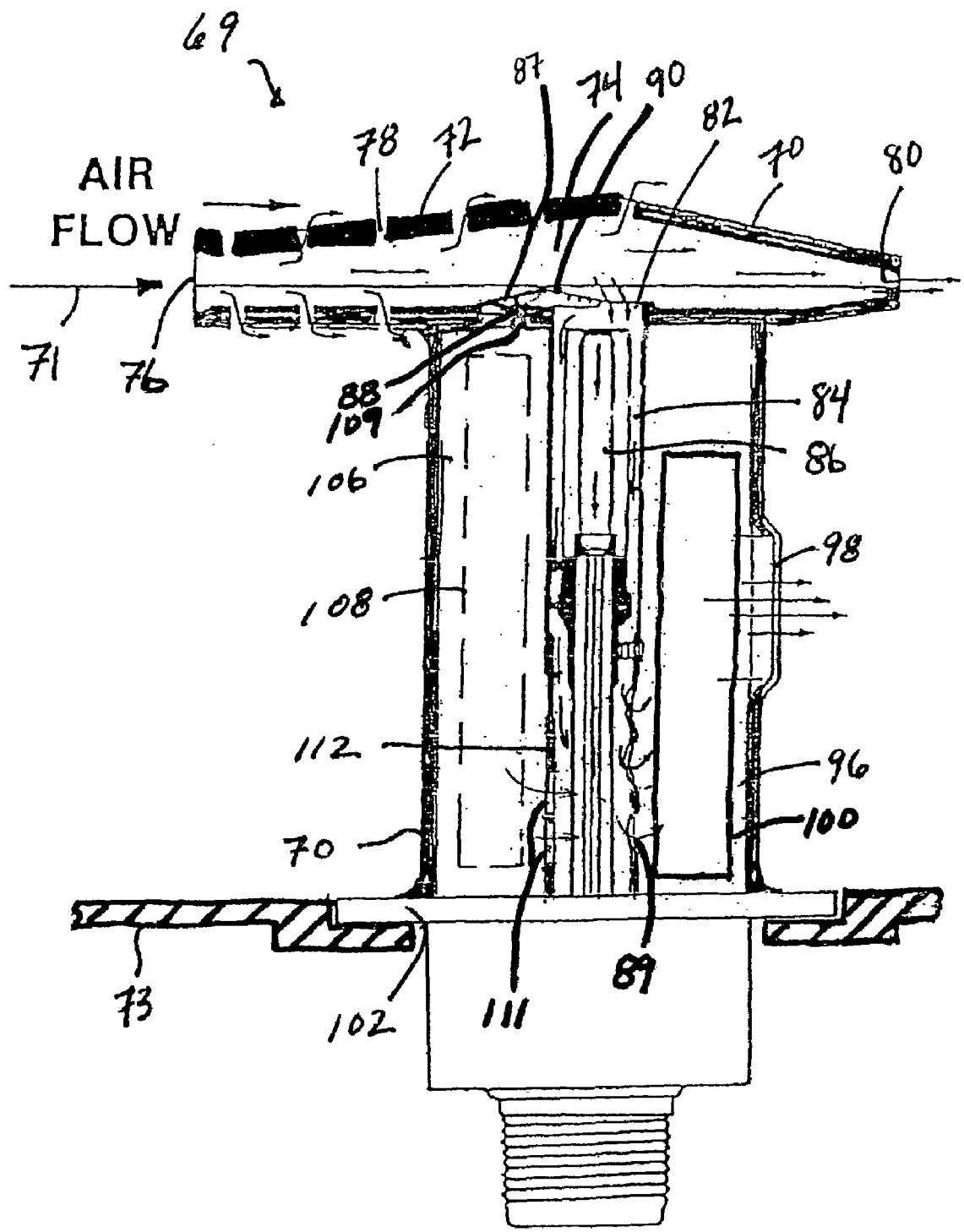
FIG. 2 is a sectional view of an alternate form of a total air temperature sensor probe having the secondary chamber aft of the main sensing element.

FIG. 2 illustrates an alternate form of a TAT probe 69. In this form of the invention, probe 69 has a probe housing 70 that protrudes from base 102 supported on an aircraft skin 73 and has an elongated upper air flow tube 72 defining an air flow passageway or duct 74, with an inlet end air scoop 76. The air flow direction is indicated by arrow 71. The boundary layer control in this form of the invention is provided by bleed openings 78 through the wall of tube 72 along the duct 74. The duct 74 has a reduced-size control orifice 80 at the trailing end of the duct 74.

A TAT sensor inlet flow port 82 is provided, and leads to a TAT flow passage or primary chamber 84 in which a TAT sensor 86 is mounted. The primary chamber 84 has lower air outlet ports 89, as shown in the surrounding wall 112 of the primary chamber 84. An elbow wall portion 90 is positioned in the flow duct 74. The elbow wall portion is raised from the bottom of the duct 74 and has small bleed air openings 87 extending there through so bleed air enters secondary chamber 106.

In this form of the invention, an aft or secondary chamber 96 is provided at the aft portion of the probe housing 70. An air outlet opening or port 98 leads from the chamber 96 to the exterior of the probe 69. Within the aft chamber 96 is mounted a secondary air data sensor 100, in a suitable manner, to the base 102 of the probe housing 70. This secondary sensor receives air flow from the ports 89, as air passes from primary chamber 84 through ports 89 to secondary chamber 96, and flows out through the outlet port 98 on the aft side of the probe housing 70.

The probe housing 70 also has a forward secondary chamber 106, which can also (or alternatively) be used for mounting a secondary sensor 108 (represented in dotted lines) if desired, by providing a port 109 between the laterally extending flow channel 88 and secondary chamber 106. Ports 111 are placed in surrounding wall 112 of TAT primary chamber 84. Air flows from secondary chamber 106 through ports 111 and 89, and through port 98. The probe can thus have a single secondary chamber (such as chamber 48 in FIG. 1, or chambers 96 or 106 in FIG. 2) and corresponding secondary sensor, or the probe can have a pair of secondary chambers (i.e., chambers 96 and 106) and corresponding secondary sensors in addition to the primary chamber 84 for the TAT sensor.

Figure 3:
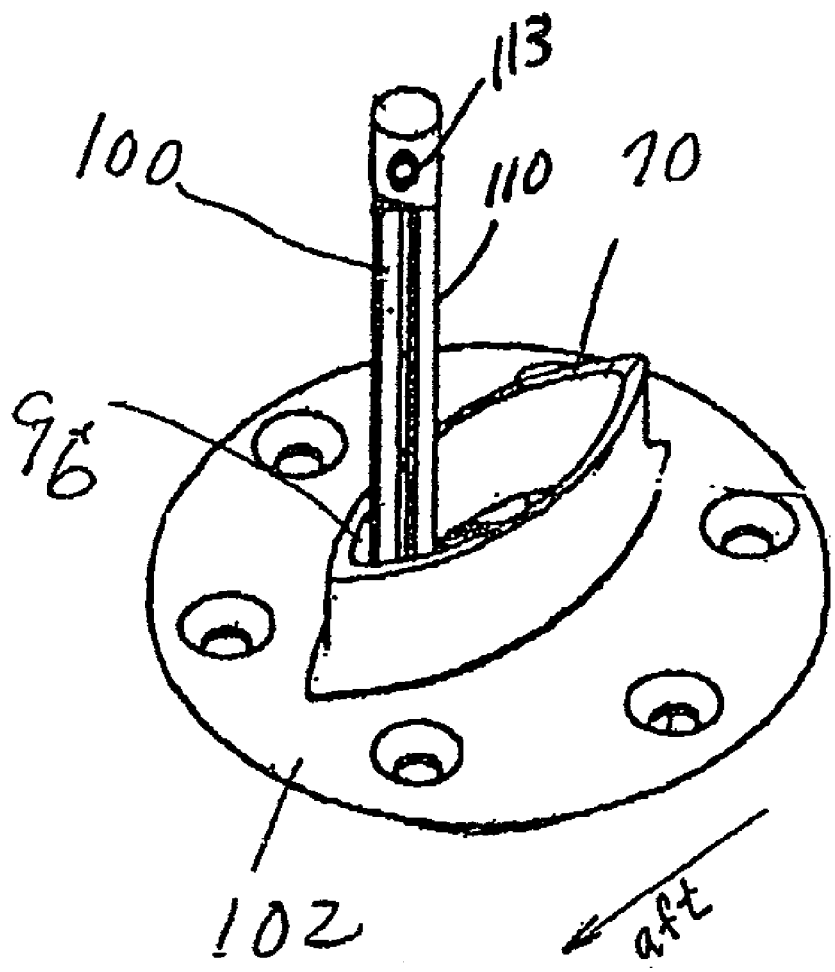
FIG. 3 is a cut-away view of a perforated tube for mounting a secondary sensor in an aft chamber of the total air temperature probe housing of FIG. 2.

FIG. 3 illustrates a cut away section of the probe housing 70 in accordance with one possible modification of TAT probe 69 shown in FIG. 2. In embodiments of the present invention utilizing an aft secondary sensor chamber, such as chamber 96 in FIG. 2, attention should be given to the size, mounting, and location of the secondary sensor 100, such that the air flow affecting characteristics of the primary TAT sensor 86 are preserved. For example, in one possible modification of TAT probe 69 shown in FIG. 2, a perforated tube 110 (FIG. 3) surrounds, and is closely spaced from, a secondary air data sensor 100 in order to support the secondary sensor while allowing air to flow to the secondary sensor. Tube 110 is shown with portions cut away in order to illustrate the positioning of secondary sensor 100 within tube 110.

While a single circular perforation 113 is shown in tube 110, additional perforations can be included, other perforation shapes can be utilized, or other techniques can be used to allow air to flow to sensor 100. In these embodiments, perforated tube 110 is mounted onto the base 102 of the probe housing 70, projecting upwardly into aft secondary chamber 96. Since use of perforated tube 110 shown in FIG. 3 is only one possible technique for mounting the secondary sensor 100 within the aft secondary chamber while maintaining the air flow properties of the primary TAT sensor, tube 110 is not shown in FIG. 2. Other techniques can be used with the TAT probe configuration shown in FIG. 2 as well.

Figure 4:
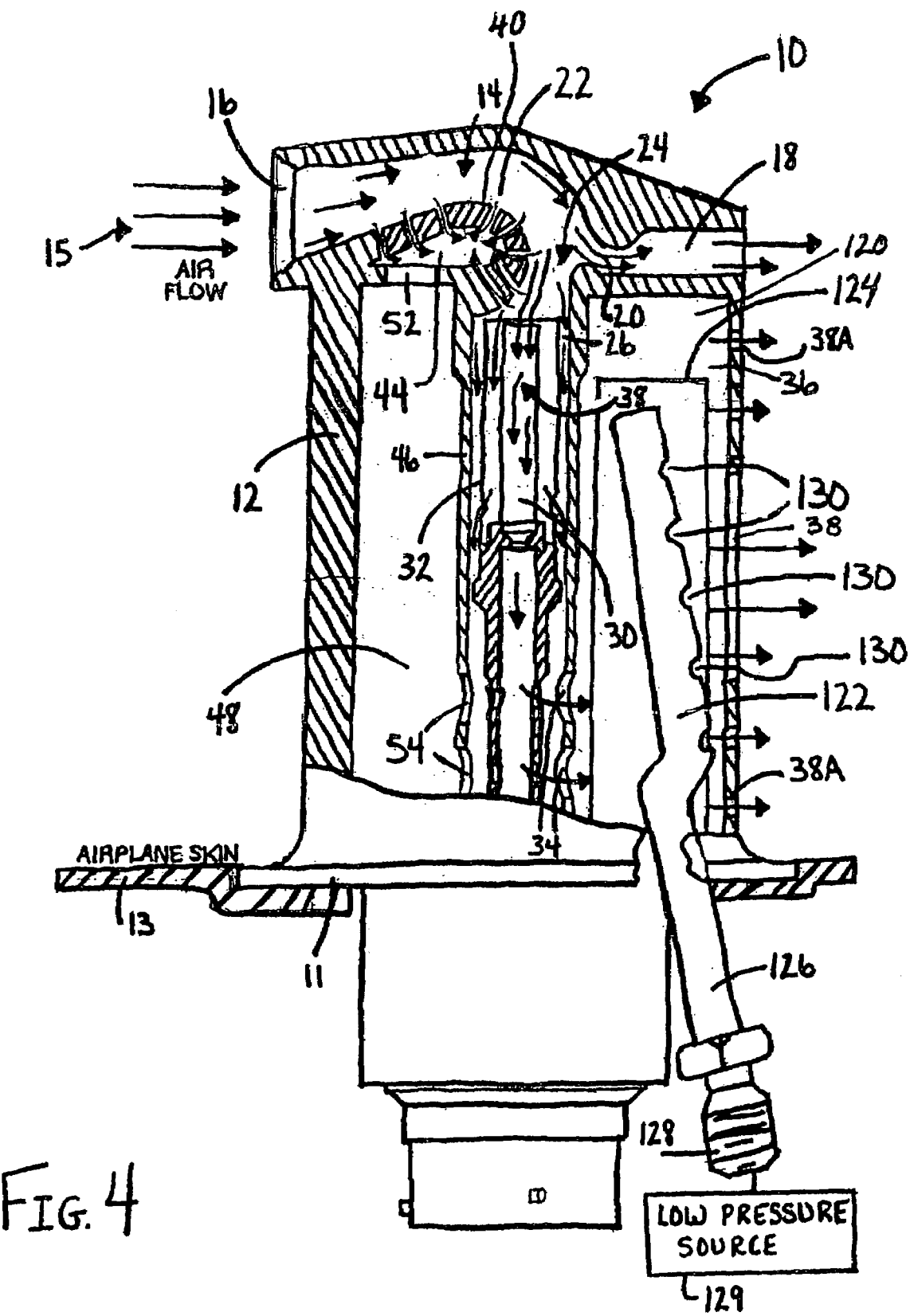
FIG. 4 is a sectional view showing an aft secondary sensor chamber with an aspirated-type total air temperature sensor.

FIG. 4 shows a modified TAT sensor probe, constructed essentially the same as the probe of FIG. 1. The same basic numerals will be used in FIG. 4. The probe 10 has an aspirator tube 122 in the aft chamber 36 for aspirating or ejecting air from the interior passageways and chambers of the probe housing 12 to aid in cooling the probe and maintaining an air flow across the TAT sensing element 30 and across a secondary sensor 124 so the air flow is representative of the outside air conditions. The construction of the TAT sensor housing 12 is the same as that shown in FIG. 1, except that an aft secondary air data chamber 120 is provided for, and contains the aspirator tube 122 as well as the secondary sensor 124.

Sensor 124 can be an optical sensor for sensing an air data parameter, such as humidity, or can be other types of sensors. For example, sensor 124 can be any of the sensor types mentioned in reference to FIG. 1, but is not limited to these sensor types. In the embodiment illustrated in FIG. 4, secondary sensor 124 is positioned adjacent aspirator tube 122. However, as is described below in greater detail with reference to FIGS. 5 and 6, aspirator tube 122 and secondary sensor 124 can be combined if desired.

The aspirator tube 122 is connected to a tube 126 that extends into the interior of the aircraft. Tube 122 has a fitting 128 that leads to a low pressure, flow controlled pressure source 129 in the aircraft. The pressure source 129 can be a fan or pump, and is designed to provide an adequate air flow for the aspiration of chamber 120. The aspirator tube 122 has a number of rearwardly facing or aft facing ports 130, to provide aspiration in a known manner used with TAT sensors in the prior art. The flow out of the ports 130 and exit port 38 reduces the pressure in chamber 120, thereby increasing the air flow through TAT sensor primary chamber 26 and across sensing element 30, and if used, the forward and/or rearward secondary chambers 48 and 120. Each exit port 38 can be aligned with one of the ports 130, to permit the aspiration air flow to be ejected. The flow through or across the secondary sensor 124 is air which flows through the chamber 120 as previously described in connection with FIG. 2.

Figure 5:
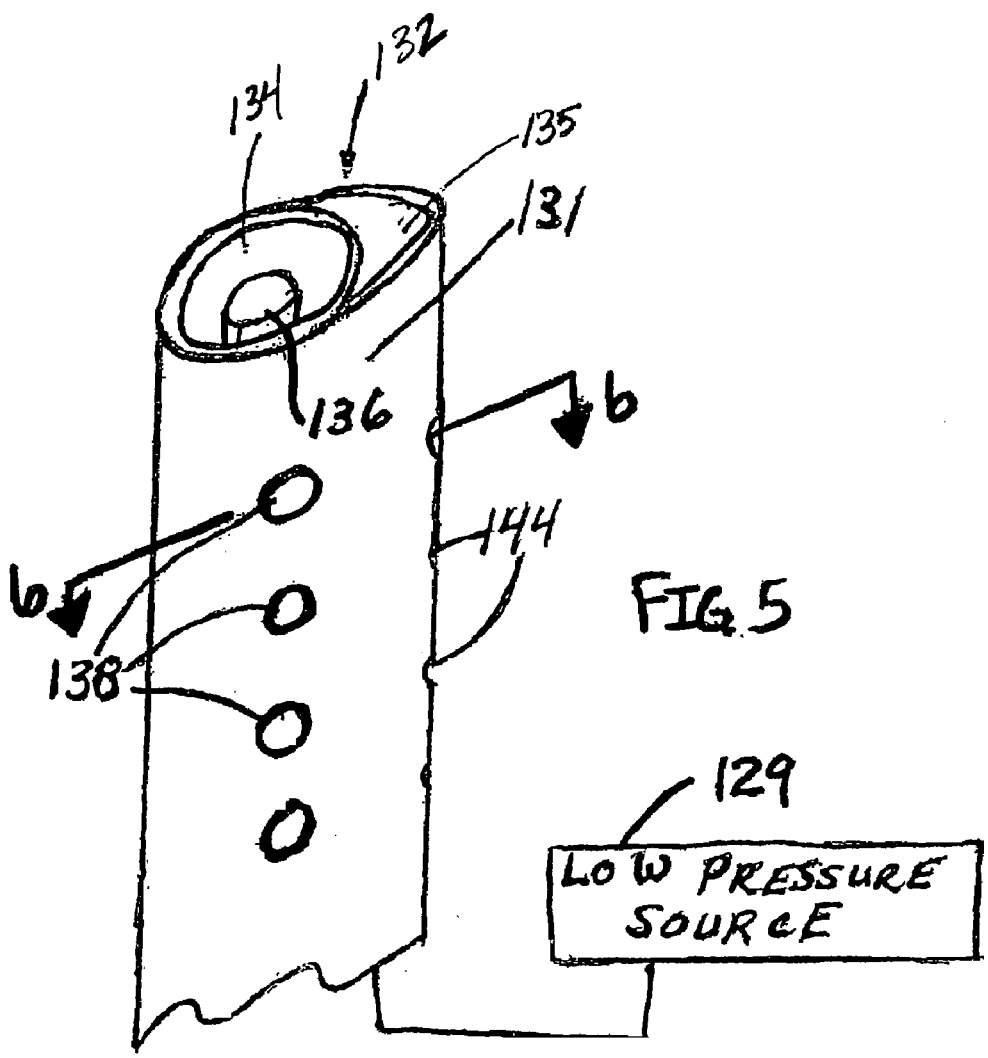
FIG. 5 is a perspective view of a modified dual air passage aspirator tube and sensor housing for use in an aft probe chamber.
Figure 6:
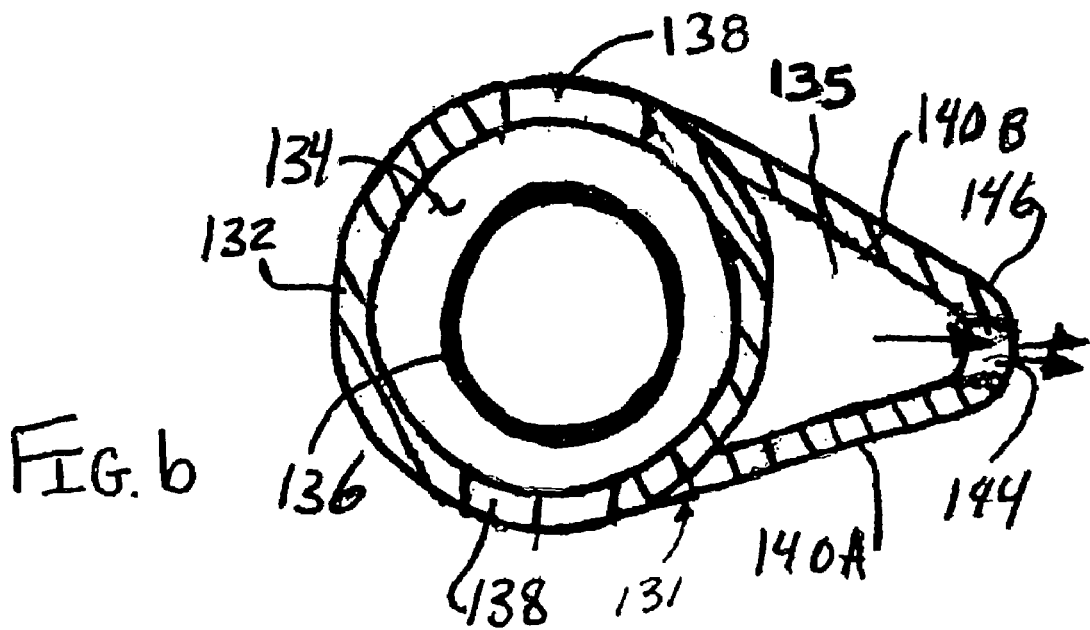
FIG. 6 is a sectional view taken on line 6—6 in FIG. 5.

A modified aspirator tube and secondary sensor housing or shield is shown in FIGS. 5 and 6. These modifications can be used, for example, in alternate embodiments of the TAT sensor probe 10 shown in FIGS. 1 and 4. In these embodiments, a combination aspirator tube and sensor housing tube 131 is attached to the base 11 of the TAT probe housing 12 and connected to tube 126 and pressure source 129 in a manner shown in FIG. 4. Tube 131 provides an interior chamber 134 for mounting a secondary sensor 136 in place. A second interior chamber 135 is also provided by tube 131. The tube 131 has laterally facing ports 138 to provide for air flow past secondary sensor 136. Air flow past sensor 136 also enters tube 131 from its open top 132. The sensor 136 is subjected to the air that is flowing through the TAT probe and can be used for sensing humidity or some other parameter of the air.

Additional ports 144 in tube 131 are included to enable aspiration air flow in chamber 135 of tube 131. While the position of secondary sensor 136 within chamber 120 protects it from impaction by particles, its position within tube 131 provides additional protection, while reducing the design considerations required to include both a secondary sensor and an aspirator tube.

The aspirator tube section of FIG. 6 is formed with a pair of tapered walls 140A and 140B that join the side walls of the tube 131, and are formed in a V-shape that forms an aspirator air passageway 135. A series of rear facing discharge ports 144 are provided at the rearwardly extending peak 146 of the aspirator tube formed by walls 140A and 140B, to provide for ejection of air from the passageway 135, and from the interior of the probe housing, as shown in FIG. 4. The passageway 135 is connected to carry flow from the low pressure source 129.

Thus, the arrangement shown in FIGS. 5 and 6 provides a dual compartment tube in the aft chamber for an aspirated TAT sensor probe, to combine the functions of the aspirator tube and a shield for secondary sensor 136 in one upright structure. The shape of combined sensor and aspirator tube 131 is streamlined to preclude undue obstruction of air exiting primary TAT chamber 26, enabling proper TAT sensing function and aspirator operation. The secondary sensor can be used for sensing humidity, or any other aspect or component of air.

Although the present invention has been described with reference to preferred embodiments, workers skilled in the art will recognize that changes may be made in form and detail without departing from the spirit and scope of the invention. For example, while the present invention is described with reference to certain secondary sensor types (e.g. humidity sensors, etc.), any type of secondary sensor which measures an aspect, property or component of air can be used.

What is claimed is:

1. Apparatus for measuring properties of a fluid flowing therepast, comprising:
   a. a housing having an opening to receive the flowing fluid, and an exit;
   b. a duct through the housing permitting at least a portion of the fluid to flow from the leading end opening to the exit;
   c. a primary chamber in fluid communication with the duct to receive a portion of the fluid flowing through the duct;

d. a temperature sensor in the primary chamber;
e. a secondary chamber with at least one secondary sensor therein;
f. at least one side exit port in the housing;
g. a channel fluidly connecting the secondary chamber to at least one side exit port;
h. an additional secondary chamber in fluid communication with the primary chamber and containing a third sensor; and
i. an aspirator tube in the additional secondary chamber, the aspirator tube comprising a combined sensor chamber and aspirator tube, the aspirator tube being separated from the sensor chamber, and rearwardly facing ports for discharging fluid from the aspirator tube.

2. The apparatus of claim 1, further comprising at least one bleed hole for fluidly communicating boundary layer fluid from the duct to the secondary chamber.

3. The apparatus of claim 2, wherein the at least one bleed hole is positioned upstream of the fluid communication between the duct and the primary chamber.

4. The apparatus of claim 3, wherein the duct has an elbow wall portion, and the least one bleed hole extends through the elbow wall portion.

5. The apparatus of claim 2, wherein the at least one bleed hole opens into the channel.

6. The apparatus of claim 1, wherein the secondary sensor is selected from the group consisting of a humidity sensor, a pressure sensor, a water vapor sensor, a $CO_2$ sensor, a nitrogen sensor, an air constituent sensor, and an air contaminant sensor.

7. The apparatus of claim 1, wherein the secondary chamber is positioned in the housing forward of the primary chamber, and further comprising at least one port leading to the primary chamber from the secondary chamber.

8. The apparatus of claim 1, wherein the additional secondary chamber is positioned in the housing aft of the primary chamber.

9. The apparatus of claim 1, wherein a low pressure source of fluid is connected to the aspirator tube.

10. The apparatus of claim 1, wherein the additional secondary chamber has at least one opening on an aft side thereof for discharging fluid from the primary and secondary chambers.

11. Apparatus for measuring properties of a fluid flowing therepast, comprising:
   a. a housing having a duct therethrough permitting fluid flow from the leading, upstream end of the housing to the aft, downstream end;
   b. a primary chamber in fluid communication with the duct to receive a portion of the fluid flowing through the duct;
   c. a temperature sensor in the primary chamber;
   d. a secondary chamber with at least one secondary sensor therein;
   e. at least one bleed hole which is operable to substantially avoid passing damaging particles fluidly communicating boundary layer fluid from the duct to the secondary chamber;
   f. an additional secondary chamber in fluid communication with the primary chamber and containing a third sensor; and
   g. an aspirator tube in the additional secondary chamber, the aspirator tube comprising a combined sensor chamber and aspirator tube, the aspirator tube being separated from the sensor chamber, and rearwardly facing ports for discharging fluid from the aspirator tube.

12. The apparatus of claim 11, wherein there is a channel interposed between the at least one bleed hole and the secondary chamber.

13. The apparatus of claim 11, wherein the at least one bleed hole is positioned upstream of the fluid communication between the duct and the primary chamber.

14. The apparatus of claim 13, wherein the duct has an elbow wall portion, and the at least one bleed hole extends through the elbow wall portion.

15. The apparatus of claim 11, wherein the secondary sensor is selected from the group consisting of a humidity sensor, a pressure sensor, a water vapor sensor, a $CO_2$ sensor, a nitrogen sensor, an air constituent sensor, and an air contaminant sensor.

16. The apparatus of claim 11, wherein the secondary chamber is positioned in the housing forward of the primary chamber, and further comprising at least one port leading to the primary chamber from the secondary chamber.

17. The apparatus of claim 11, wherein the additional secondary chamber is positioned in the housing aft of the primary chamber.

18. The apparatus of claim 11, wherein a low pressure source of fluid is connected to the aspirator tube.

19. The apparatus of claim 11, wherein the additional secondary chamber has at least one opening on an aft side thereof for discharging fluid from the primary and secondary chambers.

20. Apparatus for measuring properties of a fluid flowing therepast, comprising:
   a. a housing having a duct therethrough permitting fluid flow from a leading, upstream end of the housing to an aft, downstream end;
   b. a primary chamber in fluid communication with the duct to receive a portion of the fluid flowing through the duct;
   c. a temperature sensor in the primary chamber;
   d. a secondary chamber; and
   e. a tube in the secondary chamber, the tube having at least a first interior chamber containing a secondary sensor, and a second interior chamber connected to a source of aspiration fluid.

21. The apparatus of claim 20, wherein each interior chamber has at least one port communicating with the exterior of the tube.

22. The apparatus of claim 20, wherein the second interior chamber is positioned aft of the first interior chamber.

23. The apparatus of claim 20, wherein the exterior of the tube has a streamlined shape.

24. The apparatus of claim 20, wherein the second interior chamber is formed with a pair of walls that join the side walls of the tube and form a V-shape.

* * * * *